INVENTORS.
Wendell R. Dieman
Richard L. Lambden
Arnold Pickles

BY William D. Fosdick
AGENT

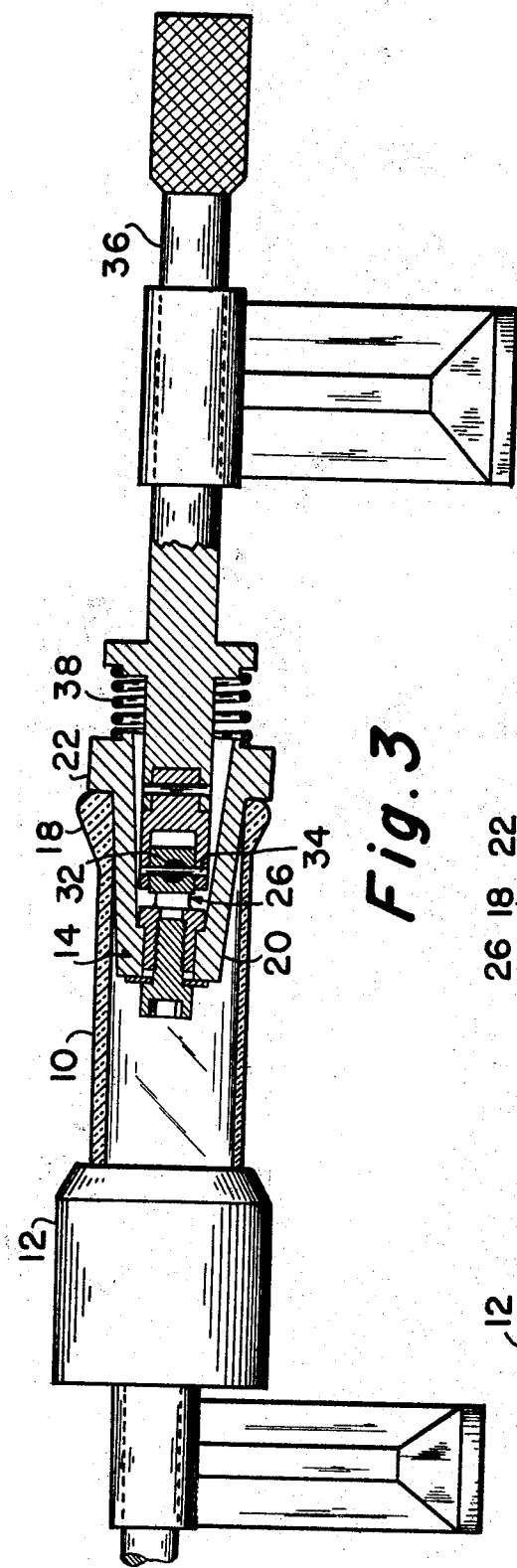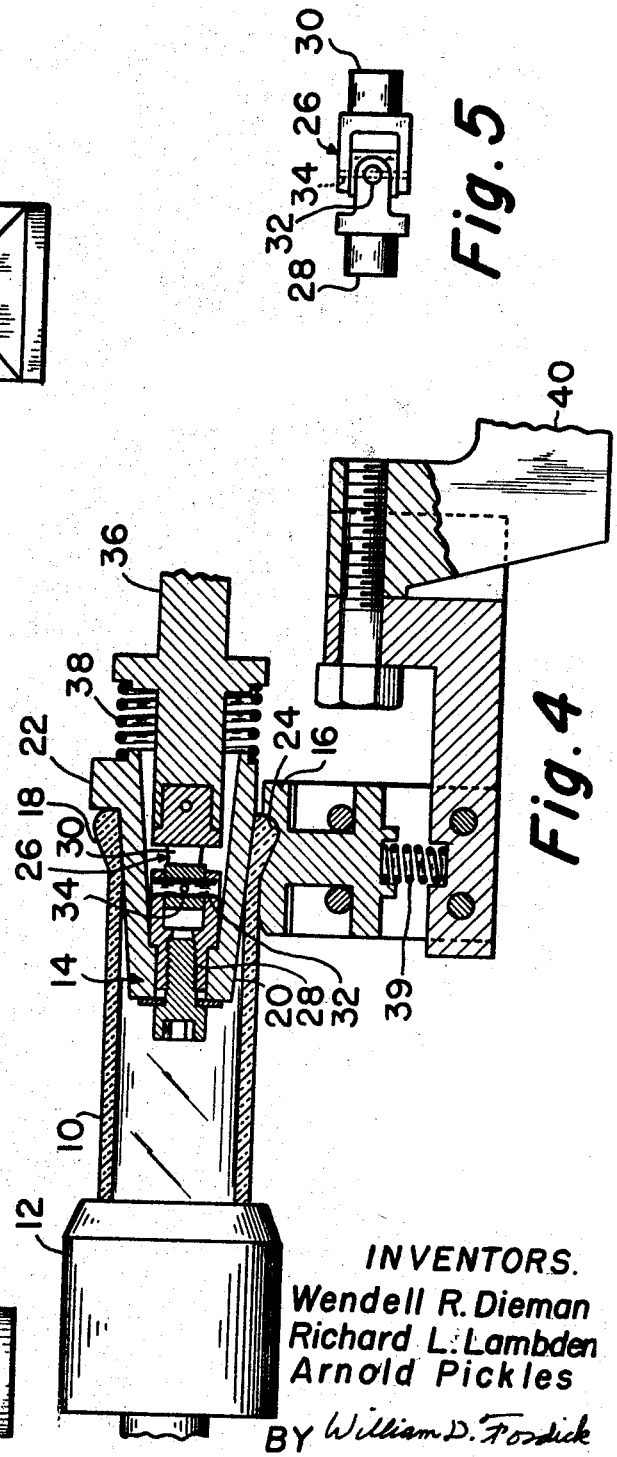

– Patented June 10, 1969

3,449,105
FLEXIBLE SHAPING TOOL

Wendell R. Dieman, Richard L. Lambden, and Arnold Pickles, Muskogee, Okla., assignors to Corning Glass Works, Corning, N.Y., a corporation of New York
Filed Mar. 11, 1966, Ser. No. 533,704
Int. Cl. C03b 29/02, 23/04
U.S. Cl. 65—298      7 Claims

ABSTRACT OF THE DISCLOSURE

A device for shaping a flange on the end of a tubular glass article. The device comprises a conical forming tool having a flange at its larger end. The device is pivotally supported on the same side of the flange as the smaller end of the conical surface to permit lateral displacement in order to compensate for variations in glass wall thickness.

---

This invention relates to apparatus for shaping annular end surfaces of glass articles, such as glass tubing, and more particularly to such apparatus having the ability to compensate for variations in the thickness of the glass being shaped.

Formerly, in the manufacture of glass pipe, glass flasks having tubular ends, and similar glass articles, the end surfaces of the tubular portions thereof have been formed by the use of tools having conical forming surfaces inserted within the interiors of the articles. The articles and tools have, in the past, been maintained in fixed angular relationship with regard to one another. When such means have been used to shape end surfaces of varying thickness along their peripheries, the results have not always been entirely satisfactory due to the incomplete shaping of those portions containing lesser amounts of glass.

Accordingly, it is an object of the present invention to provide apparatus for shaping annular surfaces of glass articles with equal effectiveness along their peripheries regardless of variations in article thickness in the vicinity of the edges.

This and other objects, which will be apparent from the detailed description of the invention, are accomplished by the provision of a tapered tool capable of insertion into an opening in a glass article, the tool having a flange at its larger end and being resiliently mounted to permit angular displacement about a point between the flange and the smaller end of the tapered tool.

The invention will be described with reference to the accompanying drawing, in which:

FIGURE 3 is a sectional view taken on line 3—3 of FIGURE 2, FIGURE 4 is a sectional view taken on line 4—4 of FIGURE 2, and FIGURE 5 is a side elevational view of the universal joint employed in the inner tool of the invention.

Figure 1:
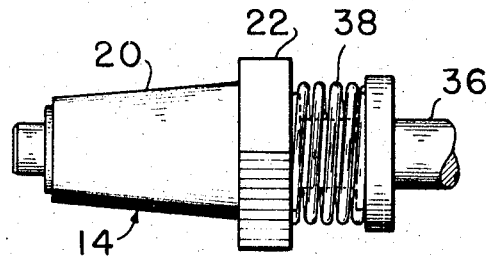
FIGURE 1 is a side elevational view of the inner tool of the invention.
Figure 2:
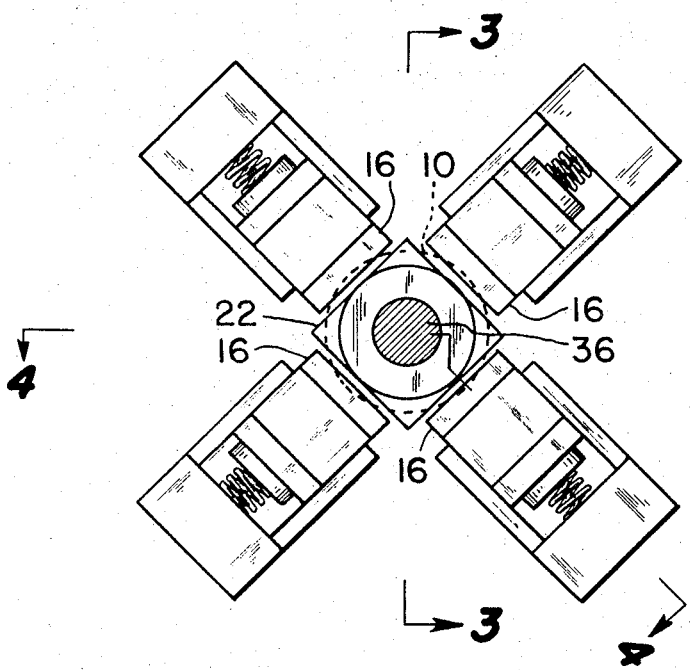
FIGURE 2 is a partial end elevational view of the inner tool and the outer tools used in conjunction therewith.

Referring to the drawing, glass tubing 10, which has its end surface softened by the influence of heat either previous to or during the shaping operation, is supported by rotating chuck 12, which is caused to rotate by conventional means, not illustrated. Inner tool 14 is inserted into the bore of the tubing, while outer tools 16 cooperate therewith to form flange 18 on the tubing. Inner forming tool 14 has an outer surface 20 in the form of a frustum of a cone having its axis initially coincident with that of tubing 10. Surface 20 terminates at its larger end at a transverse flange 22. Flange 18 on the glass tubing is formed by the cooperative action of surface 20, flange 22 and grooves 24 in the outer tools.

The ability of the inner tool to compensate for variations in the thickness of the glass tubing in order to produce uniformly tooled end flanges is illustrated in FIGURE 3. It will be observed that the bottom portion of the glass tubing is thinner than the top portion, i.e., there is less glass at the bottom of the tubing than at the top. Since the flange is formed by pressing the glass at the end of the tubing inwardly from the end of the tubing and outwardly from the axis thereof, the shape of the external surface of the flange is a function of the amount of glass present. When an inflexible inner tool is used, the flange corresponding to tool flange 22 causes the end of the hot glass tubing to be pressed back by an equal axial distance along the entire periphery of the end. Therefore, due to the varying thickness of the tubing, a smaller amount of glass is displaced outwardly from the axis in those portions of the tubing having the thinnest walls. The result is that the flange in such areas is smaller than that in areas having more glass available. The present invention permits the formation of a flange having a substantially uniform shape about the entire circumference of the tubing due to the fact that inner tool 14 is suspended on a universal joint 26 inside the bore of the tubing. The universal joint comprises two arms 28 and 30 which pivot respectively about pins 32 and 34. The tool is supported from arm 28, while arm 30 is connected to shaft 36 by which the tool is moved into and out of engagement with the tubing. Spring 38 maintains the tool in axial alignment with shaft 36 in the absence of external forces, and permits the tool to move resiliently about the universal joint.

As illustrated in FIGURE 3, when a portion of the hot glass tubing being formed by the tool is thinner than the remaining portions of the tubing, the glass offers less resistance to deformation, and, therefore, tool 14 is angularly displaced about the universal joint in the direction of minimum glass. As a result, the soft glass in the thinner portion is forced back and at the same time outwardly away from the axis of the tubing by distances greater than those for glass in thicker edge portions, thereby forming a flange having a generally uniform outer surface. As the tubing rotates, tool 14 will oscillate about its universal joint, and tools 16, which are resiliently supported on springs 39, move slightly in radial and axial directions with respect to the pipe in order to maintain contact with, and to impart shape to, the tubing flange. Except for the movement permitted by springs 39, tools 16 are otherwise held by rigid supports, such as support 40.

It is necessary that inner tool 14 pivot about a point, or points, inside the space defined by surface 20, or intermediate flange 22 and the smaller end of the tool. With such arrangement, as the tool pivots, in the locations of minimum glass, flange 22 moves axially against the end surface of the tubing, and, at the same time, surface 20 moves radially outward against the inner surface of the tubing. Thus, the outer surface of the tubing flange in locations of minimum glass is formed by displacement of glass outwardly by the conical tool surface and in the direction of the main body of the tubing by the tool flange. The result is a tooled end flange wherein the outer surface of the flange is substantially uniform, but wherein the tooled inner surface is in the form of a cone having its longitudinal axis at a slight angle with the axis of the tubing, and wherein the end surface of the tooled tubing lies in a plane not precisely perpendicular to the axis of the tubing. If tool 14 were pivoted about a point outside glass tubing 10, then, as tool flange 22 moved toward the main body of the glass tubing in the vicinity of a thin wall, conical surface 20 would move away from the thin wall portion. Thus, glass would flow radially inwardly, rather than outwardly, and an incomplete glass flange would be formed.

The apparatus of the present invention has been found particularly useful in tooling the tops of Erlenmeyer flasks to produce tooled flanges having satisfactory visual appearance and providing satisfactory stopper fit.

According to the preferred embodiment of the invention, the glass tubing, rather than the forming tools are rotated. It will be appreciated that, although such arrangement is preferable, relative rotation between the tools and the glass tubing may be effected by rotating the tools rather than the tubing, or by rotating each at different speeds. Similarly, for certain flange configurations the presence of outer forming tools 16 is not required. It will be further appreciated that the apparatus of the invention may be used to tool annular glass surfaces on articles of other than tubular configuration, and that other forms of pivots or universal joints, such as ball-and-socket joints, springs or bellows, may be employed to allow angular displacement of the inner tool. Accordingly, it is intended that the scope of the present invention be limited not by the description provided herein as that of a preferred embodiment of the invention, but rather only by the scope of the appended claims.

We claim:

1. Apparatus useful in shaping a flange on a heat-softened annular edge portion of a glass body, which apparatus comprises a tool having a generally conical outer shaping surface terminating at its larger end in a transverse flange, tool support means, and means for pivotally suspending said tool from said tool support means at a location on the same side of said flange as the smaller end of said conical outer shaping surface so as to permit said tool and flange to move angularly laterally to compensate for variations in annular edge portions of glass bodies formed by said conical surface and said flange.

2. Apparatus according to claim 1 which includes means for supporting a glass body to be shaped, means for moving said tool into contact with an annular edge portion of said body, and means for effecting relative rotation between said tool and said body to cause said tool to shape an annular flange on said edge.

3. Apparatus according to claim 2 in which said tool and said tool support means are connected by means of a universal joint.

4. Apparatus according to claim 2 which includes at least one outer tool in spaced relation with the first-mentioned tool for engaging the outer surface of said edge portion to cooperate with said inner tool to impart a controlled flared shape to said edge portion.

5. A tool useful in shaping heat-softened annular surfaces of glass articles, said tool comprising a support, a body having a generally conical outer shaping surface terminating at its larger end in a transverse flange, said body being pivotally suspended from said support at a location generally between said flange and the smaller end of said body, and spring means acting between said support and said body permitting resilient angular displacement of said body with respect to said support.

6. Apparatus for shaping a heat-softened annular end portion of a glass article, said apparatus comprising first means for supporting a glass article, inner tool means having a tapered surface provided with a flange at its larger end, second means for supporting said inner tool means with its small end within a glass article supported by said first means with said flange bearing against an annular end portion of said glass article, suspension means for resiliently supporting said inner tool means from said second means to permit angular displacement of said inner tool means with respect to said second means about a point intermediate said flange and said small extremity of said inner tool means with said flange resiliently bearing upon said annular end portion of said glass article, means for effecting relative rotation between said glass article and said inner tool means, and outer tool means spaced from said inner tool means and cooperable with said inner tool means to impart a controlled flange shape to said annular end surface of said glass article.

7. Apparatus according to claim 6 which includes means for resiliently supporting said outer tool means.

References Cited

FOREIGN PATENTS 1,105,605 7/1955 France.

DONALL H. SYLVESTER, *Primary Examiner.*

A. D. KELLOGG, *Assistant Examiner.*

U.S. Cl. X.R.

65—277, 282, 299